Patented Dec. 26, 1939

2,185,119

UNITED STATES PATENT OFFICE

2,185,119

SUBSTANTIALLY NONGELLING COATING COMPOSITION OF ZEIN IN CLOSED-CHAIN ALCOHOLS

Roy E. Coleman, Meriden, Conn., assignor to The Zein Corporation of America, a corporation of Delaware No Drawing. Application January 28, 1938, Serial No. 187,560

14 Claims. (Cl. 134—12)

This invention relates to substantially non-aqueous solutions or coating compositions of the prolamins which are characterized by their reduced tendency towards gelling and, in many instances, freedom from gelling tendencies over practical periods of time in the order of 3 to 6 months and even more.

The present application is a continuation-in-part of my copending applications Serial No. 158,215, filed August 9, 1937, and Serial No. 158,735, filed August 12, 1937; and is related to my copending application Serial No. 187,559, filed on even date herewith.

In the following description of my invention I refer to solutions of zein derived from corn, but it is, of course, to be understood that my invention is also applicable to solutions of the other prolamins such as, for example, gliadin from wheat, hordein from barley, kafirin from kafir and the prolamins from other cereal grains. The above-mentioned prolamins are at present ordinarily derived by extraction of the gluten of corn or other cereal grains with an aqueous alcohol solution in which the added water varies generally from about 8 to 40% of the solvent mixture, the extract so produced being dried, forming a dried prolamin extract which may be completely dried, or in commercial form contains a small percentage of moisture. Such prolamin extracts, such as zein extracted from corn, may be used in accordance with my invention, although zein or other prolamins obtained in any other suitable manner may also be used.

In my prior applications referred to above, I have described solutions and liquid coating compositions containing prolamins and particularly zein which are anhydrous or substantially anhydrous and which, in concentrations in which the proportion of solvent to zein is from about 2:1 upward, and more, and particularly from 4 to 5:1, are stable in the cold in that they do not separate or form and deposit a separate phase or layer containing largely zein with a supernatant layer of liquid consisting largely of solvent. The formation of such stable solutions is important in connection with the utilization of zein and similar prolamins in the production of coating compositions and the like, since they enable the zein to be put in a homogeneous and usable form either for direct use or for compounding with other materials, solvents, non-solvents, coating and film-forming materials and the like.

It has been found, however, that some zein solutions even of the stable character hereinbefore referred to are limited in their application and use because of a tendency, which frequently appears, to increase in viscosity; that is, to thicken or to become heavier in body; and in many cases to gel. Such tendencies to increase in viscosity, or to gel, while not preventing the utilization of the compositions immediately or within short periods after preparation, do impose serious limitations on their wide-spread commercial application and utilization, since the materials must remain stable and reasonably constant in their characteristics during the periods necessary for transportation and distribution either in bulk or in packages, and to permit of reasonable periods of storage.

In accordance with the present invention, I have developed solutions containing prolamins and particularly zein and methods of making the same whereby the tendencies to gel, in which I include the tendency to increase in viscosity which is ordinarily a preliminary of gelling, are retarded and in many cases completely prevented, so as to greatly increase the field of applicability, and permit wider distribution and conventional handling of the manufactured products without material change in characteristics or solidification by gelling over such reasonable periods of time as are involved in such handling and distribution of the materials.

I am of the opinion that the phenomenon of gelling of such solutions and compositions and their increase in body or viscosity as a whole are probably related to the phenomenon of separation, since when separation takes place in many cases the separated phase containing large proportions of zein is itself a gel in character; and since also in many cases compositions containing zein which tend to separate when the proportion of solvent to zein is as high as about 3:1 and higher will gel as a whole with lower proportions of solvent or higher concentrations of zein; and also since many solutions which are stable and do not separate when the proportion of solvent to zein is from 2 to 2.5:1 or higher will form gels as a whole if they contain higher proportions of zein. However, in the consideration of the tendency to gel and to increase in viscosity or body as referred to in the present application I have reference to the tendency of solutions to gel as a whole or to increase in viscosity through their entire mass, in cases in which the proportions of solvent to zein are in the order of 2 to 2.5:1 and higher, up to 9 or 10:1, which are the solutions and compositions of a concentration which is most important from the standpoint of the production of films, coatings and the like and which range of concentration is more particularly referred to in my aforesaid prior copending applications, relating to the production of stable solutions. It is to be appreciated that solutions or compositions which are stable and in which the tendencies to gel and to increase in viscosity are adequately retarded or prevented within this range of concentrations may, with higher concentrations of zein, be more likely to form gels; but in any case the compositions prepared in accordance with the present invention will have a less tendency to form gels or to increase in viscosity than the solutions hitherto known.

In accordance with my present invention, I have found that substantially nongelling stable solutions of zein in relatively high-boiling substantially non-aqueous solvents can be formed directly without the addition of any water. The relatively high-boiling substantially non-aqueous solvents embodying my invention may suitably be one of the class of closed chain alcohols such as the aryl and cyclic alcohols, for example, benzyl alcohol, furfuryl alcohol, cyclohexanol; or any mixture of these relatively high-boiling solvents. While zein is soluble, as hereinafter set forth, in these relatively high-boiling solvents without added water, the use of small amounts of water up to about 5% in these solvents is not precluded.

The solutions or coating compositions of zein in these relatively high-boiling, closed-chain alcohol solvents, produced in accordance with the present invention, are stable on standing at temperatures of 80° F. and below and do not separate even when cooled to temperatures of 50 to 70° F. and somewhat below. When cooled to temperatures as low as 10° above zero or to zero, solutions prepared in accordance with the present invention may separate and become solid; however, on heating again to temperatures of from about 45° to 70° F., a resolution is effected, either without, or with slight stirring, and the solutions return to the normal form at the re-heating temperatures. The stable solutions prepared in accordance with the present invention have very little tendency to thicken and gel and in some instances practically no tendency to thicken or gel over practical periods of time in the order of 3 to 6 months. They contain no added water, or only small amounts of added water up to about 5%, and are, therefore substantially non-aqueous.

In producing solutions or coating compositions in accordance with my invention, the zein or other prolamin is mixed with any one or more of the relatively high-boiling direct alcohol solvents, for example, benzyl alcohol. The mixing may be carried out in any suitable vessel or container such as, for example, a kettle, usually with some stirring and with the application of heat generally higher than 100° F. and in the order of about 110° to 200° F. and higher depending on the particular solvent or mixture of solvents utilized. A stable, substantially nongelling solution or coating in these direct relatively high-boiling alcohol solvents is obtained generally in about 5 to 20 minutes and in most instances satisfactory solutions or coatings are obtained in about 5 to 15 minutes with the utilization of temperatures in the order of about 110° to 180° F., the time and temperatures being influenced by the quantities of materials used.

The quantity of direct relatively high-boiling closed-chain alcohol solvent necessary to effect a substantially nongelling stable solution or coating composition of the zein is suitably in the order of about at least 3 parts by weight of the solvent to about 1 part by weight of zein. In some instances as, for example, with benzyl alcohol, 2 parts by weight of the solvent to 1 part by weight of the zein is sufficient to produce a substantially nongelling stable solution or coating composition in accordance with my invention. In general, satisfactory solutions or coating compositions may be obtained with the use of from about 3 to 20 or more and preferably 3 to 9 parts by weight of the solvent to 1 part by weight of zein. The most practical working solutions or coating compositions are obtained with the use of 3 to 5 parts by weight of the solvent to 1 part by weight of the zein. It is, of course, obvious that the viscosity of coating compositions obtained in accordance with my invention is at least in part dependent on the proportion of solvent used.

The following examples are illustrative of the methods for producing coating compositions embodying my invention which are substantially nongelling over practical periods of time; in many cases over 3 to 6 months. In these examples, the term "parts" indicates parts by weight.

*Example 1*

10 parts of zein are mixed with 30 parts of benzyl alcohol in a suitable vessel. On stirring and with the application of a slight heat in the order of about 115° to 120° F., a clear, brilliant, stable solution of the zein in the benzyl alcohol is obtained in about 5 to 15 minutes. The solution is rather viscous.

*Example 2*

10 parts of zein are mixed with 50 parts of benzyl alcohol in a suitable vessel. On stirring the mixture and with the application of slight heat in the order of about 110° to 115° F., a clear, brilliant, stable solution of the zein is obtained in about 5 to 10 minutes. The solution obtained is less viscous than that obtained by the method of Example 1.

*Example 3*

10 parts of zein are mixed with 40 parts of cyclohexanol in a suitable vessel. On stirring and with the application of heat in the order of about 170° to 180° F., a stable solution of the zein in the cyclohexanol is obtained in about 7 to 12 minutes.

*Example 4*

10 parts of zein are mixed with 40 parts of furfuryl alcohol. On stirring and with the application of heat in the order of about 185° to 195° F. a clear stable solution of the zein in the furfuryl alcohol is formed in about 5 to 10 minutes.

The coating compositions embodying my invention have the unusual property, particularly when heated, of being able to "give up" their solvent or solvents readily when applied to any surface and they readily form tough, flexible, non-tacky, hard and generally transparent films. The films are very strong and have unusual adherent properties. With the aid of these coating compositions the film forming properties thereof can be built up to produce a film of greater toughness, flexibility, hardness and gloss than is capable of being formed from coating compositions containing added water in an amount greater than 5%. Under normal temperature conditions the solutions produced in accordance with my invention will produce nonblushing coatings, on drying, without the aid of supplementary anti-blushing agents as in the prior art. These coating compositions may be applied to any surface and they may be used for coating, sizing, impregnating and waterproofing any material such as paper, textiles, wood, wood pulp and the like. When coated on paper, Cellophane, glass and the like, a film is formed almost immediately which possesses the film characteristics set forth above. Since these coating compositions have decided adhesive properties, they may be used either per se or in combination with other materials for uniting or laminating paper, cloth, wood, glass, felt, Cellophane, metals and metal foils and the like.

The characteristics of the coating compositions embodying my invention, and hence of the ultimate films formed therefrom, can be altered at will and as desired by the inclusion of diluents, modifiers, plasticizers and fillers, as set forth in my prior copending application, Serial No. 158,215, filed August 9, 1937. The characteristics such as spread and flow of these coating compositions may also be modified by the addition of a fatty acid such as, for example, oleic, linseed, hemp seed, lauric and like fatty acids, by the inclusion of blown or bodied drying oils, such as blown china wood oil or other oxidized oils, and by the inclusion of cetyl, lauryl, myristyl and like fatty alcohols having 8 or more carbon atoms in the chain. If desired, compatible natural and synthetic resins such as, for example, rosin, sandarac, copal, phenol-aldehyde, urea-aldehyde, glycerine-phthalic anhydrid, vinyl and like resins, or compatible cellulose derivatives such as, for example, high and low viscosity nitrocellulose, cellulose acetate, ethyl cellulose and like cellulose derivatives may be incorporated in the coating compositions in varying proportions to meet any desired needs.

In the claims, when I use the expression "substantially non-aqueous", I refer to solutions or coating compositions containing no added water or only small amounts of added water up to about 5%; and when I use the expression "stable" I refer to solutions or coating compositions which, when the concentration of zein in the solvent varies from about 1 part by weight of the zein to about at least 3 parts by weight of the solvent, the solutions do not separate on standing or even when cooled to a temperature of 50° to 70° F. and somewhat below. When I use the expression "nongelling" I refer to solutions or coatings which in general have very little tendency to thicken and gel and in some instances practically no tendency to thicken and gel over practical periods of time.

I claim:
1. A substantially non-aqueous coating composition comprising a substantially non-aqueous solution of a prolamin comprising about 1 part by weight of the prolamin and at least about 3 parts by weight of a solvent comprising a direct relatively high-boiling closed-chain alcohol solvent having a boiling point in the order of about at least 311° F. which is stable as regards separation at temperatures of 70° F. and which is substantially nongelling, said alcohol containing not in excess of 5% of water and said composition containing not in excess of about 5% of added water.

2. A substantially non-aqueous coating composition comprising a substantially non-aqueous solution of zein comprising about 1 part by weight of zein and at least about 3 parts by weight of a direct relatively high-boiling closed-chain alcohol solvent having a boiling point in the order of about at least 311° F. which is stable as regards separation at temperatures of 70° F. and which is substantially nongelling, said solvent containing not in excess of 5% of water and said composition containing not in excess of about 5% of added water.

3. A substantially non-aqueous solution of zein in a direct relatively high-boiling closed-chain alcohol solvent having a boiling point in the order of about at least 311° F. wherein at least about 3 parts by weight of the solvent are combined with 1 part by weight of zein, said solution being stable as regards separation at temperatures of 70° F. and beinging substantially nongelling, said alcohol containing not in excess of 5% of water and said solution containing not in excess of about 5% of added water.

4. A substantially non-aqueous coating composition comprising a substantially non-aqueous solution of zein comprising about 1 part by weight of zein and at least about 3 parts by weight of benzyl alcohol which is stable as regards separation at temperatures of 70° F. and which is substantially nongelling, said alcohol containing not in excess of 5% of water and said composition containing not in excess of about 5% of added water.

5. A substantially non-aqueous coating composition comprising a substantially non-aqueous solution of zein comprising about 1 part by weight of zein and at least about 3 parts by weight of furfuryl alcohol which is stable as regards separation at temperatures of 70° F. and which is substantially nongelling, said alcohol containing not in excess of 5% of water and said composition containing not in excess of about 5% of added water.

6. A substantially non-aqueous coating composition comprising a substantially non-aqueous solution of zein comprising about 1 part by weight of zein and at least about 3 parts by weight of cyclohexanol which is stable as regards separation at temperatures of 70° F. and which is substantially nongelling, said alcohol containing not in excess of 5% of water and said composition containing not in excess of about 5% of added water.

7. A substantially non-aqueous coating composition comprising a substantially non-aqueous solution of zein in benzyl alcohol wherein at least 3 parts by weight of the alcohol are combined with 1 part by weight of zein and which is stable as regards separation at temperatures of 70° F. and which is substantially nongelling, said alcohol containing not in excess of 5% of water and said composition containing not in excess of about 5% of added water.

8. A substantially non-aqueous solution of zein in a solvent comprising furfuryl alcohol wherein at least 3 parts by weight of the alcohol are combined with 1 part by weight of the zein and which is stable as regards separation at temperatures of 70° F. and which is substantially nongelling, said alcohol containing not in excess of 5% of water and said solution containing not in excess of about 5% of added water.

9. A substantially non-aqueous solution of zein in a solvent comprising cyclohexanol wherein at least 3 parts by weight of the alcohol are combined with 1 part by weight of zein and which is stable as regards separation at temperatures of 70° F. and which is substantially nongelling, said alcohol containing not in excess of 5% of water and said solution containing not in excess of about 5% of added water.

10. A substantially non-aqueous coating composition comprising a substantially non-aqueous solution of zein comprising about 1 part by weight of zein and at least about 3 parts by weight of a solvent comprising a relatively high boiling closed-chain alcohol having a boiling point in the order of about at least 311° F. which is stable as regards separation at temperatures of 70° F. and which is substantially nongelling, said alcohol containing not in excess of 5% of water and said composition containing not in excess of about 5% of added water.

11. A substantially non-aqueous coating composition comprising a substantially non-aqueous solution of zein comprising about 1 part by weight of zein and at least about 3 parts by weight of a solvent comprising benzyl alcohol which is stable as regards separation at temperatures of 70° F. and which is substantially nongelling, said alcohol containing not in excess of 5% of water and said composition containing not in excess of about 5% of added water.

12. A substantially non-aqueous coating composition comprising a substantially non-aqueous solution of zein comprising about 1 part by weight of zein and at least about 3 parts by weight of a solvent comprising a furfuryl alcohol which is stable as regards separation at temperatures of 70° F. and which is substantially nongelling, said alcohol containing not in excess of 5% of water and said composition containing not in excess of about 5% of added water.

13. A substantially non-aqueous coating composition comprising a substantially non-aqueous solution of zein comprising about 1 part by weight of zein and at least about 2 to 10 parts by weight of a solvent comprising a relatively high boiling closed-chain alcohol having a boiling point in the order of about at least 311° F. which is stable as regards separation at temperatures of 70° F. and which is substantially nongelling, said solvent containing not in excess of 5% of water and said composition containing not in excess of about 5% of added water.

14. A substantially non-aqueous coating composition comprising a substantially non-aqueous solution of zein comprising about 1 part by weight of zein and at about 2 to 10 parts by weight of a solvent comprising benzyl alcohol which is stable as regards separation at temperatures of 70° F. and which is substantially nongelling, said solvent containing not in excess of 5% of water and said composition containing not in excess of about 5% of added water.

ROY E. COLEMAN.